United States Patent
Alexander

[15] 3,681,983
[45] Aug. 8, 1972

[54] SYSTEM FOR MEASURING FLUID FLOW

[72] Inventor: William Alexander, 784 Dixon Way, Los Altos, Calif. 94022

[22] Filed: May 11, 1971

[21] Appl. No.: 142,203

[52] U.S. Cl. .................................... 73/186, 73/228
[51] Int. Cl. ........................................... G01c 23/00
[58] Field of Search ....... 73/186, 228, 189; 33/206 D, 33/206 DL

[56] References Cited

UNITED STATES PATENTS 2,539,788  1/1955  Matcovich ................. 73/186

*Primary Examiner*—Donald O. Woodiel
*Attorney*—Edward A. Robinson

[57] ABSTRACT

A system for measuring fluid flow, and more specifically, a speedometer/odometer system for a sailboat or the like, includes a transducer mounted to tilt at an angle by fluid flowing there around. The transducer contains an elongated arcuate cavity with an electrically resistive element extending along the bottom of the cavity. As the angular tilt of the transducer is varied by varying fluid flow, a drop of mercury moves along the cavity making electrical contact with various points of the resistive element to vary the electrical resistance value of the transducer. An operational amplifier receives a signal from the transducer via a first summing resistor and passes the signal to a meter for providing a visual indication of the velocity of fluid flow or the speed of the boat. A second summing resistor of lesser value may be switched to the operational amplifier to provide an increased signal for an expanded scale of the meter to sense small incremental changes of the boat's speed. A third summing resistor connects the operational amplifier to a potentiometer for generating an adjustable input signal to center the meter for the expanded scale readings. An integrating amplifier receives the signal from the transducer for advancing an odometer indicator in steps or increments such that a motor driving the odometer indicator will conserve power from the voltage source which may be small batteries.

13 Claims, 6 Drawing Figures

Fig_1

INVENTOR.
WILLIAM ALEXANDER

PATENTED AUG 8 1972 3,681,983

INVENTOR.
WILLIAM ALEXANDER
BY Edward A. Robinson
Attorney

SYSTEM FOR MEASURING FLUID FLOW

BACKGROUND OF THE INVENTION

This invention relates to systems for measuring flow of fluids, and more particularly, this invention relates to such a system wherein a transducer may be mounted below a sailboat or the like to provide a speedometer and odometer which may operate from power supplied by small batteries.

It is an object of this invention to provide an improved means for measuring velocity of flow of a fluid, and more specifically, it is an object to provide an economical means for measuring and for integrating or totalizing the flow of water past a vehicle such as a small boat to determine the speed and distance of travel of the boat.

Since a sailboat or other small craft is limited in space and load capacity, any equipment attached to or carried thereon must necessarily be small and light weight. Such a boat may have no electrical power source; and therefore, electrical equipment should be designed to operate from small self-contained batteries which can be tested occasionally to determine a degree of deterioration due to aging. Electrical equipment should operate with a minimum power to conserve the life of the batteries. Motors and such may be operated intermittantly with intervals of quiescence to further conserve the batteries. Therefore, it is a further object of this invention to provide a speedometer adapted to be carried by a small boat and adapted to operate from a minimum power which can be supplied by small batteries of the type commonly used in small portable radios, and to provide an odometer wherein an indicator is periodically advanced in steps by a motor that may remain quiescent for intervals between each step or advancement of the odometer indicator.

It is another object to provide an improved transducer for generating an electrical signal in accordance with a velocity of fluid flow; and more particularly, it is an object to provide such a transducer that may be pivotally mounted or suspended from a boat or the like whereby the flow of fluid will cause the transducer to have an angular tilt which may be converted into the electrical signal.

SUMMARY OF THE INVENTION

According to this invention, a system for measuring fluid flow includes a transducer mounted to tilt and having a cavity therein with an electrically resistive element that is contacted by a drop or mass of mercury at a point determined by the tilt of the transducer. The electrical resistance of the transducer is determined by the position of the mercury within the cavity, which is determined by the degree of tilt, which in turn is determined by the fluid flow around the transducer. An indication of the fluid velocity is shown by a meter which measures a signal from the transducer which is passed by an operational amplifier. By switching summing resistors of the operational amplifier, an expanded scale reading may be obtained for sensing small incremental changes in the flow velocity. The meter may be centered for the expanded scale mode of operation by adjusting a potentiometer for passing an additional signal voltage to the operational amplifier. An odometer indicator is stepped along at periodic intervals in accordance with a signal derived by integrating the signal from the transducer.

DESCRIPTION OF THE DRAWING

The various features and advantages of this invention will become apparent upon consideration of the following description taken in connection with the accompanying drawings, which show an exemplary embodiment of the fluid flow measuring system of this invention. The views of the drawings are as follows.

DESCRIPTION OF THE PREFERRED EMBODIMENT

Figure 1:
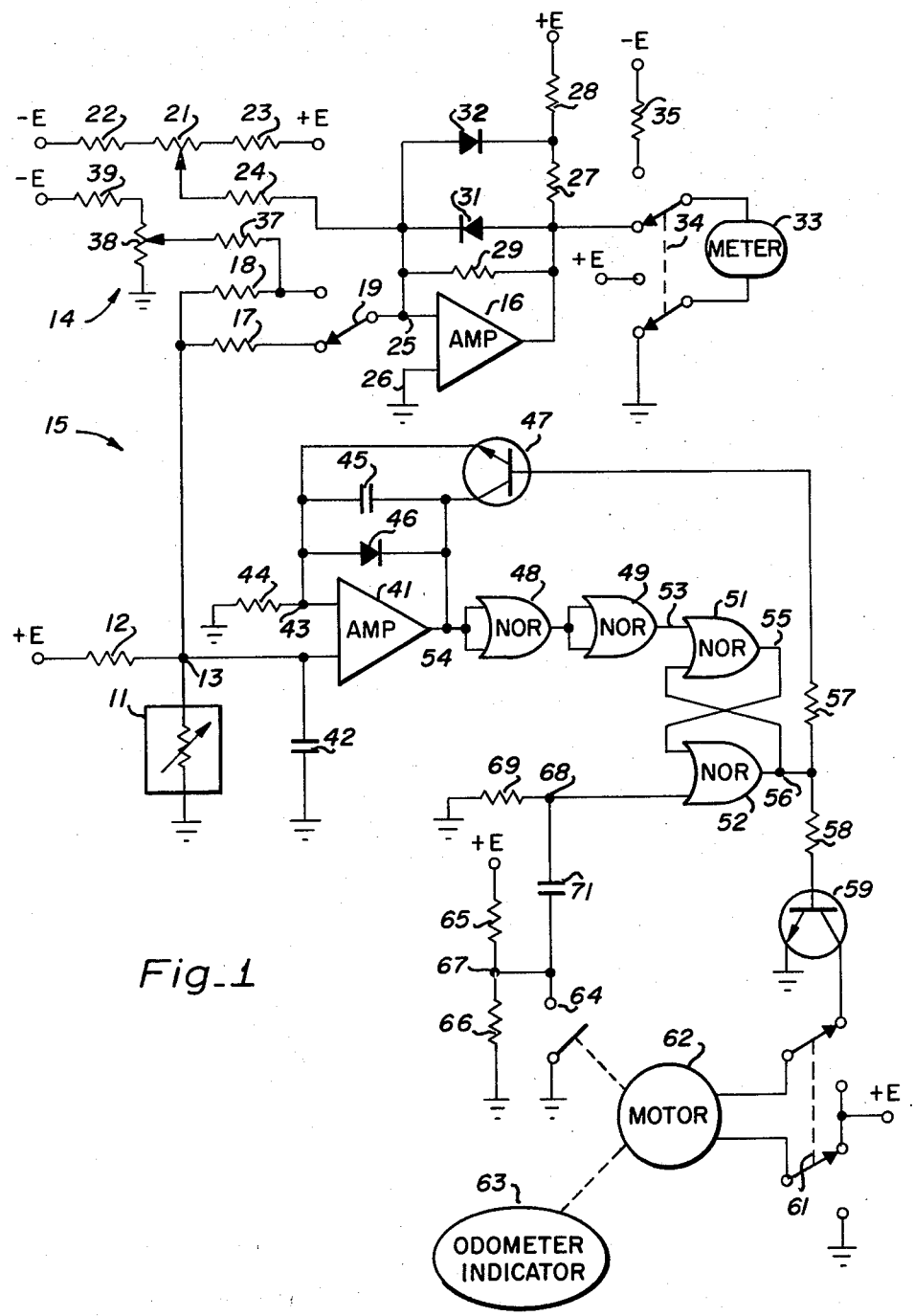
FIG. 1 is an electrical circuit diagram of the system of this invention.

The fluid flow measuring system as shown in FIG. 1 includes a transducer 11 which is a variable resistance element. The transducer 11 and a resistor 12 are connected in series between a voltage source +E and ground potential such that a voltage corresponding to the fluid flow will appear at the series connection point 13. The voltage of the point 13 is passed to a speedometer or fluid velocity measuring circuit 14 and an odometer or fluid totalizing circuit 15.

The speedometer or fluid velocity measuring circuit 14 includes an operational amplifier 16 which is coupled to the transducer 11 by a selected one of two summing resistors 17 or 18. A switch 19 may select the resistor 17 for providing a true reading of velocity, or the switch 19 may select the resistor 18 for providing an expanded scale reading for sensing changes in velocity in a manner to be discussed subsequently. Since this system may be used as a speedometer for sail boats and the like, it may be powered by small batteries which are subject to aging and gradual deterioration. A potential dividing network including a potentiometer 21 and two series resistors 22 and 23 is coupled to the amplifier 16 by a summing resistor 24 to provide a zero or null adjustment for the system. This zero or null adjustment will compensate for aging and deterioration of the batteries.

The operational amplifier 16 is a conventional component circuit and is commercially available as a miniaturized circuit. The input voltage is impressed between a summing junction 25 and a ground connection 26. A pair of serially connected resistors 27 and 28 provide a coupling between the output of the amplifier 16 to the voltage source +E. A resistor 29 provides a feedback path from the output of the amplifier 16 to the summing junction 25. A diode 31 is coupled as a second feedback path by-passing the resistor 29 to prevent the output voltage from amplifier from assuming a positive polarity. Another diode 32 provides a further feedback path from the potential dividing resistors 27 and 28 to the summing junction 25, and this diode prevents the output voltage of more than 5 volts. A direct current voltmeter 33 is coupled to the amplifier 16 by a switch 34, and is protected from reversed polarities and over-voltages by the diodes 31 and 32.

As indicated above, this circuit is designed for operation from batteries which may deteriorate with age. Two such batteries of the type used in small portable radios may constitute the +E and the —E voltage sources of this system. The voltmeter 33 can be used to test the batteries by throwing the switch 34 to an alternative position wherein the meter 33 is connected in series with a resistor 35 across the two voltage sources +E and —E. The resistor 35 and the resistive value of the meter windings provide a potential dividing network to proportionally reduce the voltage applied to the meter, such that the full scale voltage of the meter will not be exceeded.

When the fluid flow measuring system of this invention is used as a speedometer for a small craft such as a sailboat, the input summing resistor 17 and the feedback resistor 29, being equal in value, provide the amplifier 16 with unity gain. Under these conditions the meter 33 will provide an indication of the true speed of the boat. The meter 33 will provide reading in a scale ranging from 0 to 12 knots, which is considered to be the usual range of speeds for sailboats. In sailing a boat, the sails and rudder should be trimmed or adjusted for optimum performance of the boat to gain a maximum speed from prevailing wind and water current conditions. Sometimes it is not readily apparent what trim or sail adjustments will provide the maximum speed, and it may be desired to experiment and determine the optimum adjustments by trial and error. At such times, it is important to have an accurate means for determining small incremental changes in the speed of the boat.

To provide indications of incremental speed changes, the switch 19 may be thrown to the alternative position wherein the summing resistor 18 is coupled between the transducer 11 and the summing junction 25. The resistor 18 is one tenth of the value of the resistor 17, and is one tenth of the value of the feedback resistor 29; such that the gain of the amplifier is thus increased ten-fold, and any changes in the transducer resistance will produce proportionally increased changes in the meter readings. A further summing resistor 37 coupled the summing junction 25 to a potential dividing network including a potentiometer 38 and a resistor 39. The potentiometer 38 provides an additional signal source for a meter centering adjustment for this expanded scale or fine tuning mode of operation of this system. By adjusting the setting of the potentiometer 38, the needle of the meter 33 may be centered or placed in any desired position prior to the sail trimming operations of the sailboat. After the sail trimming changes have been made, any incremental increase or decrease in speed will be indicated by the meter. Different sail trims may be tried to see which will produce the greatest speed for the sailboat.

The odometer or fluid integrating and totaling circuit 15 includes an operational amplifier 41 coupled to the transducer 11 and to a by-pass capacitor 42. The amplifier 41 is similar to the amplifier 16 and may likewise be a miniaturized circuit. To provide a reversed polarity of signal in this case, the summing junction 43 is grounded by a summing resistor 44 while the transducer 11 is connected to the other input terminal of the operational amplifier 41. The amplifier 41 is connected as an integrator with a capacitor 45 providing a feedback path. A diode 46 is connected as another feedback path by-passing the capacitor 45 for preventing the output voltage of the amplifier 41 from assuming a negative polarity. A further feedback path is provided by a transistor 47 which is normally non-conductive to permit the capacitor 45 to accumulate charge.

In the operation of the odometer circuit 15 the voltage of the point 13 is passed by the amplifier 41 such that the capacitor 45 gradually increases in charge, thereby raising the output voltage of the amplifier 41. A first NOR circuit 48 constitutes a thresh-hold voltage detector. The NOR circuits are standard logic components, and are commercially available as "chips" or miniaturized circuits. In this preferred embodiment of this invention, four NOR circuits 48, 49, 51 and 52, are obtained on a single miniaturized circuit chip known commercially as "Signetic Utilogic No. 380." When no voltage appears or in sufficient voltage appears at the output of the amplifier 41, a positive voltage will appear at the output of the NOR circuit 48 to be impressed upon the input of the second NOR circuit 48 to be impressed upon the input of the second NOR circuit 49. The second NOR circuit 49 functions as an invertor such that when a positive voltage appears at the input thereof, a zero voltage will appear at its its output terminal 53. When the voltage of the amplifier 41 increases to 1.7 volts at its output terminal 54, the threshhold of the NOR circuit 48 is reached whereupon the output of the NOR circuit 48 will drop to zero voltage, and whereupon the output of the second NOR circuit 49 will assume a positive voltage. Therefore it may be appreciated that the first two NOR circuits 48 and 49 constitute a thresh-hold detector to generate a positive voltage at the point 53 when the voltage of the point 54 rises to a predetermined value of 1.7 volts.

The two NOR circuits 51 and 52 have their input and output terminals cross connected to form a flip flop. Normally, there is no voltage at the point 53 which constitutes one of the input terminals of the flip flop. With no voltage impressed upon either of the input terminals of the NOR circuit 51, a positive voltage appears at the output terminal 55 and is impressed upon an input terminal of the NOR circuit 52 whereby no voltage will appear at the output terminal 56. Therefore, the flip flop 51–52 is in a stable state which we may designate as the "reset" condition. A resistor 57 couples the output of the flip flop to the base electrode of the transistor 47; and another resistor 58 couples the output of the flip flop to the base electrode of another transistor 59. Normally, no biasing voltage appears at the output terminal 56 of the flip flop and therefore both transistors 47 and 59 remain in a state of non-condition.

While in the normally quiescent state, the transducer 11 will continually impress the integrating amplifier with a voltage representative of fluid flow or the speed of the sailboat. The output voltage from the amplifier 41 will gradually increase until the thresh-hold of 1.7 volts is reached, whereupon the conduction states of both of the NOR circuits 48 and 49 will reverse, and a voltage will be impressed upon the point 53 to trigger or "set" the flip flop. The flip flop when set will reverse its conduction states such that no voltage will appear at the terminal 55, and a positive voltage will then appear at the terminal 56. With a positive biasing voltage from the point 56 being passed via the resistors 57 and 58, the respective transistors 47 and 59 will both be biased into conduction. When the transistor 47 conducts, the capacitor 45 will be discharged and the voltage of the output of the amplifier 41 will be reduced to zero. When the transistor 59 conducts, current will be passed from the voltage source +E, through a switch 61 to drive an electric motor 62. The electric motor 62 will turn an odometer indicator 63 through one revolution to the next subsequent numerical indication thereon. After one revolution, the motor 62 will open, momentarily, a normally closed switch 64. The switch 64 may be a commutator with a single non-conductive segment to provide a momentary open circuit once each revolution. The switch 64 removes a connection to ground from a voltage dividing network including two serial connected resistors 65 and 66 having a series connection point 67. A second input terminal 68 of the flip flop 51-52 is coupled to ground potential by a resistor 69 such that the terminal has no biasing voltage applied thereto. When the switch 64 opens, a voltage appearing at the point 67 is passed by a capacitor 71 to the second input terminal 68 of the flip flop thereby resetting the flip flop into its normal conduction state. When the flip flop is reset, the transistors 47 and 59 are again restored to states of non-conduction; the motor 62 is stopped; and the capacitor 45 is again permitted to accumulate charge thereby initiating another cycle of operation.

From the above it may be appreciated that the motor 62 is normally quiescent, and will only run for brief intervals to step the odometer indicator along to each new numerical indication; and therefore, the motor 62 uses a minimum amount of power to conserve the batteries. When in operation, the motor 62 uses more power than all of the rest of the system; and therefore, it is important to conserve power by operating the motor 62 only briefly and at spaced intervals.

The switch 61, in the position as shown in FIG. 1, will pass power to run the motor 62 whenever the transistor 59 becomes conductive. In this mode, the odometer indicator 63 will be intermittently stepped along in a forward direction to indicate higher and higher numbers representative of miles travelled. Occasionally, it may be desired to reset the odometer indicator 63 by turning it back to zero. This may be accomplished by throwing the switch 61 to the alternative position whereupon the voltage supply +E will be impressed upon the motor 62 with reversed polarity to run the odometer indicator 63 back to zero.

Figure 2:
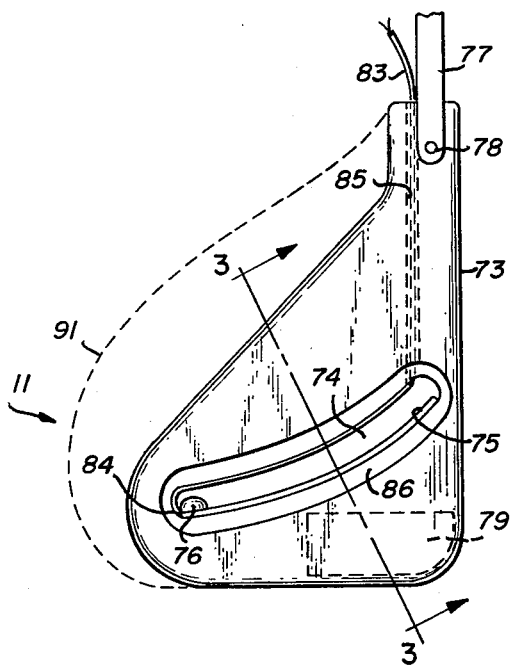
FIG. 2 is a vertical side view of the transducer used in the system shown in FIG. 1.
Figure 3:
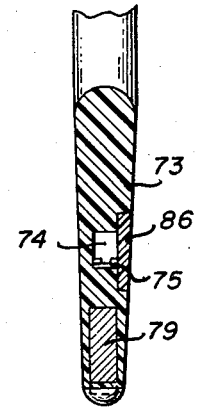
FIG. 3 is a sectional view taken along the plane 3—3 of FIG. 2.
Figure 5:
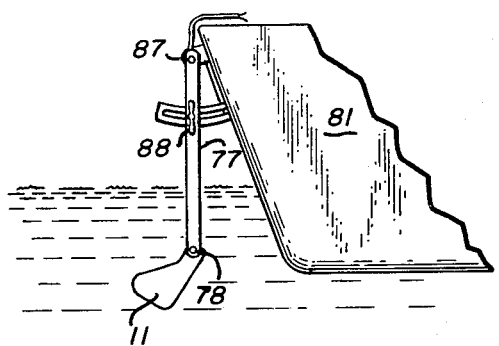
FIG. 5 is a partial vertical view of the stern of a boat showing a means for pivotally mounting the transducer in the water behind the boat.

The transducer 11 as shown in FIGS. 2 and 3 comprises a body 73 which may be molded from a plastic material with an arcuate cavity 74 therein. Electrically resistive strips 75 lie along the bottom of the cavity 74 which curves upwardly from one end to the other. A small drop or mass of mercury 76 rests upon and makes electrical contact between the resistive strips 75 at the lowest point within the cavity 74. As shown in FIGS. 2 and 5, the transducer is suspended from a supporting bracket 77 by a pivot 78. The transducer is weighted with a mass of lead 79, such that it will normally hang downwardly from pivot 78 as shown in FIG. 2. As shown in FIG. 5 the transducer 11 is pivotally suspended from the stern of a boat 81, and as the boat moves (to the right as shown in FIG. 5), the force of the water will pivot the transducer 11 rearwardly. When the transducer 11 pivots rearwardly, the mass of mercury 76 will move forwardly along the arcuate cavity 74 to remain at the lowest point of the arc. The mercury 76 makes electrical contact between the two resistive strips 75 to vary the resistance as the transducer 11 is pivoted by the force of the water or fluid medium.

Figure 4:
FIG. 4 is a developed view of an electrically resistive element to be inserted into the cavity of the transducer, as shown in FIGS. 2 and 3.

FIG. 4 illustrates the structure of the electrically resistive strips 75. This structure is formed on a plastic backing such as mylar which is coated with a thin film of electrically resistive material. The mylar is cut into elongated rectangles shaped to fit within the cavity 74. By an etching process, the central portion of the thin film resistor is removed to leave the two parallel strips 75 as shown in FIG. 4. Electrical conductors 83 are connected to one end of the strips by means such as solder or by silver filled epoxy resin 84 which has been found to make satisfactory electrical connections. The mylar backing with the electrically resistive strips 75 is inserted into the cavity 74 with the electrical connections 84 at the rearward end thereof. The electrical conductors 83 are threaded through a drilled hole 85 which is subsequently sealed with an epoxy resin or other means. The mylar backing with the resistive strips 75 thereon may be attached to the bottom side of the cavity by means such as an epoxy or other adhesive material. The mercury 76 is dropped into the cavity; and then the cavity is sealed closed by a plate of material 86. The The cover plate 86 may be of clear plastic if it is desired to leave a window through which one can view the mercury 76 on the resistive strips 75.

Figure 6:
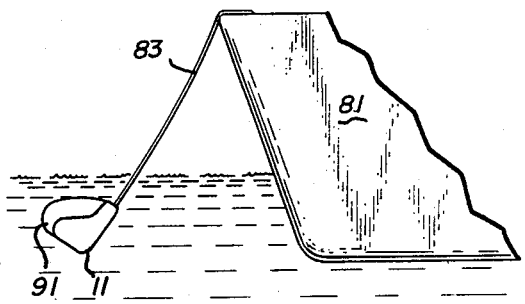
FIG. 6 is a similar partial vertical view of the stern of a boat showing another method for suspending the transducer in the water behind the boat.

FIGS. 5 and 6 show two means for suspending the transducer 11 from the stern of a boat whereby this system may be used as a speedometer/odometer. In FIG. 5, the transducer 11 is pivotally mounted on a bracket 77 which is pivotally suspended from a point 87 on the stern of the boat 81. The elongated shank of the bracket 77 is gripped by means such as a thumb screw 88 to be held in a generally vertical and apart from the sloping stern of the boat 81.

In FIG. 6, the transducer is suspended by the electrical cable 83 which performs dual functions of mechanically supporting the transducer 11 and electrically connecting the transducer to the rest of the system which is on board the boat 81. The electrical cable 83 may be flexible to allow the transducer 11 to swing outwardly from the boat 81 as shown. In this case, the fransducer 11 may be provided with a vane or rudder fin 91 to assure a proper orientation as the transducer moves through the water. Even though the transducer 11 can twist or swivel on the flexible cable 83, the rudder fin 91 will turn the body 73 to face forwardly into the fluid flow. The fact that the transducer 11 may swing rearwardly and trail behind the boat 81 is of no consequence since the angle of tilt of the transducer 11 will be a function of the velocity of fluid flow, and the mass of mercury 76 will be positioned along the resistive strips 75 in accordance with the tilt of the transducer. Thus the electrical resistance value of the transducer 11 will be a function of the fluid velocity or the speed of the boat 81 through the water.

As shown in FIG. 2, the cavity 74 is generally a circular segment, and the variation of resistance value will be substantially linear with variation of fluid velocity. With zero fluid flow, the transducer 11 will hang downwardly as shown in FIG. 2, such that the mass of mercury 76 will rest over the electrical connections 84; the resistance value will be zero; and in the circuit of FIG. 1, the voltage of the point 13 will be zero in value. As the fluid flow increases, the tilt angle of the transducer 11 increases, and the mercury mass 76 moves along the cavity 74 further from the connections 84 to place more resistance in the circuit and to increase the voltage appearing at the point 13.

In certain applications it may be desirable to generate an electrical response characteristic which is non-linear. For example, it may be desired to have an anemometer which will provide highly accurate readings of small wind velocities, but which will provide readings of lesser accuracy for the greater wind velocities. Thus the meter scale would be expanded in the region of lower wind velocities. This system is adaptable to such an anemometer, or other similar applications since the curvature of the arcuate cavity 86 may be non-uniform with a relatively flat portion having slight curvature at one end, and with a more highly curved portion toward the opposite end. In this case the mass of mercury 76 will move along the resistive strips 75 as a non-uniform function of tilt angle, and the electrical resistance characteristic of the transducer 11 will be a similar non-uniform function of the rate of fluid flow. This non-linear scale can also be achieved by using a resistive element 75 which is non-linear in character.

The invention is claimed as follows:

1. A system for measuring fluid flow comprising a tiltably mounted transducer and a metering circuit electrically coupled to the transducer, said transducer having an elongated arcuate cavity therein, an electrically resistive element disposed along the bottom of said cavity and electrically connected to said metering circuit, and a mass of electrically conductive material free to move within said cavity in electrical contact with said resistive element for varying the electrical resistance of said transducer in response to an angular tilt of the transducer.

2. A system for measuring fluid flow in accordance with claim 1 wherein said resistive element comprises a pair of parallel resistive strips extending longitudinally along the bottom of said cavity, and wherein said mass of electrically conductive material comprises a mass of mercury in contact with both of said resistive strips for making an electrical contact there between at a positioning determined by the angular tilt of said transducer.

3. A system for measuring fluid flow in accordance with claim 1 further comprising a pivotal mounting for said transducer, said transducer being operable to be pivoted by the flow of the fluid to create said angle of tilt.

4. A system for measuring fluid flow in accordance with claim 3 wherein said system constitutes a speedometer for a boat, said system comprising a bracket attached to the boat and extending downwardly therefrom, said pivot point being situated at the lower end of said bracket whereon said transducer is pivotally mounted.

5. A system for measuring fluid flow in accordance with claim 2 wherein said system constitutes a speedometer for a boat, said system comprising an electrical cable having electrical conductors connected between said resistive strips of the transducer and said metering circuit, said electrical cable being mechanically attached at one end to said transducer and adapted to be fastened at the other end to said boat, said cable being operable to suspend said transducer downwardly from said boat whereby said transducer may provide said angular tilt while suspended.

6. A system in accordance with claim 5 and further comprising a rudder vane extending rearwardly from said transducer for orienting said transducer with respect to the fluid flow.

7. A system for measuring fluid flow in accordance with claim 1 wherein said metering circuit comprises an operational amplifier having a plurality of input summing means, and a meter responsively coupled to said operational amplifier for providing an indication of velocity of said fluid flow, at least one of said summing means being electrically coupled to said transducer for passing signals from said transducer to said amplifier.

8. A system for measuring fluid flow in accordance with claim 1 wherein said system constitutes a speedometer for a boat, said system comprising an operational amplifier having an input summing junction and having an output terminal, an input summing resistor coupled between said transducer and said summing junction of the operational amplifier, a feedback resistor coupled between said output terminal and said summing junction of the operational amplifier, and a meter coupled to said output terminal of the operational amplifier for providing a visual indication of the speed of said boat derived from a signal from said transducer which is passed by said operational amplifier.

9. A system in accordance with claim 8 comprising two summing resistors both electrically coupled to said transducer, and a switch coupled between said summing resistors and said summing junction of the operational amplifier for coupling a selected one of said summing resistors to said summing junction, a first of said summing resistors being substantially equal in resistive value to the resistive value of said feedback resistor and being operable to pass a signal to said operational amplifier corresponding directly to the speed of said boat, the second of said summing resistors being substantially less in resistive value than the resistive value of said feedback resistor for passing a substantially greater signal to said operational amplifier to provide an expanded scale reading on said meter whereby incremental changes in the speed of said boat may be determined.

10. A system in accordance with claim 9 comprising an adjustable signal source, and a third summing resistor coupled between said adjustable signal source and said switch, said adjustable signal source being operable to provide a meter centering adjustment when said second summing resistor is switched to said summing junction to provide the expanded scale reading for said meter.

11. A system in accordance with claim 8 comprising an adjustable voltage source for compensating said system for deterioration of battery power, and a further summing resistor coupled between said adjustable voltage source and said summing junction of the operational amplifier.

12. A system for measuring fluid flow in accordance with claim 1 wherein said system constitutes an odometer for a boat, said system comprising an integrating amplifier electrically coupled to said transducer, said amplifier having an input summing junction and an output terminal, a capacitor coupled between said output terminal and said summing junction of the integrating amplifier for accumulating charge and gradually increasing a signal level appearing at said output terminal of the integrating amplifier, a signal level detecting means coupled to said output terminal of the integrating amplifier, an odometer indicator, means responsively coupled to said signal level detecting means and controllably coupled to said odometer indicator for incrementally advancing said odometer indicator when the signal level of said output terminal of the integrating amplifier reaches a predetermined value, and means responsively coupled to said signal level detecting means for discharging said capacitor when the signal level of said output terminal of the integrating amplifier reaches said predetermined value.

13. A system in accordance with claim 12 wherein said signal level detecting means comprises a first NOR circuit coupled to said output terminal of said integrating amplifier, and further including two further NOR circuits cross coupled together to form a flip flop, a motor coupled to drive said odometer indicator, a first transistor responsively coupled to said flip flop and coupled to pass electrical power to said motor for advancing said odometer indicator, and a second transistor responsively coupled to said flip flop and coupled to said capacitor for discharging said capacitor in response to said flip flop.

* * * * *